Feb. 26, 1929.  1,703,118
C. McCULLEY ET AL
AUTOMOBILE BODY CONSTRUCTION
Filed Sept. 27, 1922
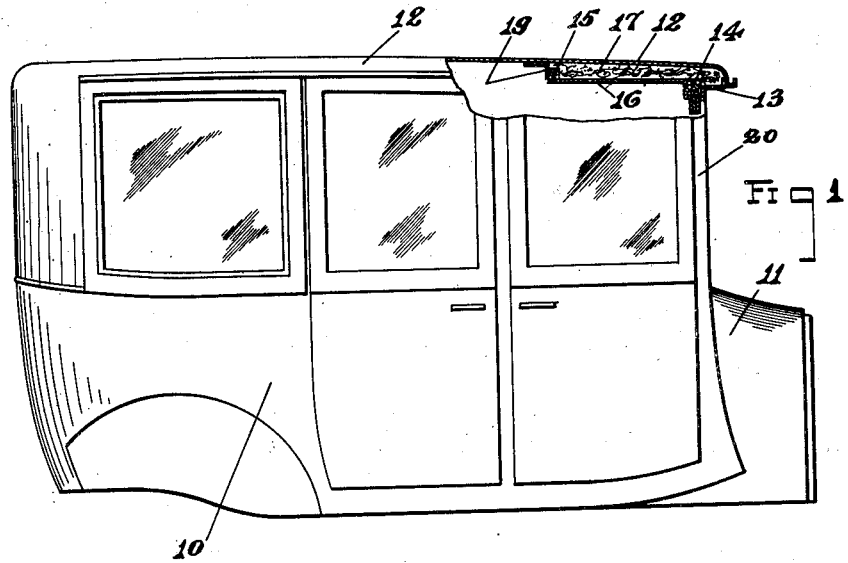
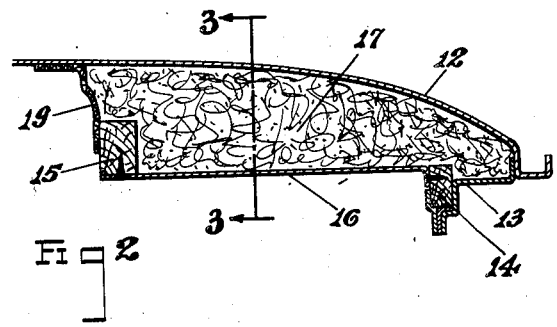
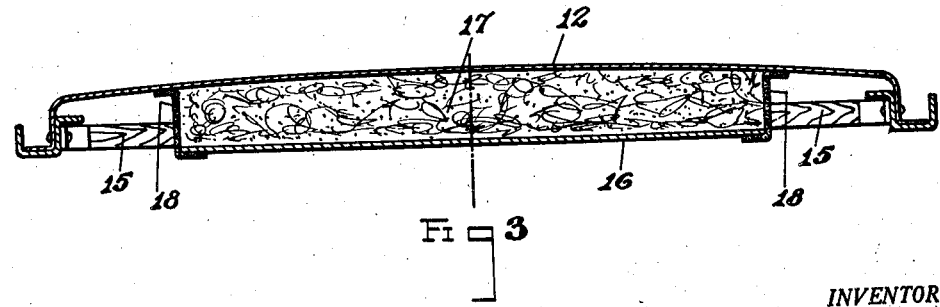
INVENTOR.
CLAUDE McCULLEY AND
BY LOUIS E. RUEHLMANN.
ATTORNEY
WITNESS:—
Walter M. Trout.

Patented Feb. 26, 1929.

1,703,118

UNITED STATES PATENT OFFICE.

CLAUDE McCULLEY AND LOUIS E. RUEHLMANN, OF PHILADELPHIA, PENNSYLVANIA, ASSIGNORS TO EDWARD G. BUDD MANUFACTURING COMPANY, OF PHILADELPHIA, PENNSYLVANIA, A CORPORATION OF PENNSYLVANIA.

AUTOMOBILE BODY CONSTRUCTION.

Application filed September 27, 1922. Serial No. 590,783.

Our invention relates to improvements in automobile body construction and has to do, more particularly, with the construction of automobile bodies of the closed type, such as, for instance, sedans or coupés.

The principal object of our invention is to provide means for reducing or eliminating the rumble or drumming noise produced in closed bodies by the vibrations incident to the operation of the automobile.

A further object of our invention is to provide, in a closed automobile body, a false roof panel for reducing or eliminating the drumming sound or rumble set up by the operation of the motor vehicle.

Further objects, and objects relating to details and economies of operation and construction, will definitely appear from the detailed description to follow. In one instance, we accomplish the objects of our invention by the devices and means described in the following specification. Our invention is clearly defined and pointed out in the appended claim. A structure constituting a preferred embodiment of our invention is illustrated in the accompanying drawing, forming a part of this specification, in which:

Fig. 1 is a view of a closed automobile body in side elevation, the upper portion of such body being broken away and shown in section, to illustrate one embodiment of our invention.

Fig. 2 is an enlarged sectional view of the forward portion of the roof, corresponding to a part of Fig. 1.

Fig. 3 is a detail, sectional view, taken on the line 3—3 of Fig. 2.

In the drawing, the same reference numerals refer to the same parts throughout the several views and the sectional views are taken looking in the direction of the arrows at the ends of the section lines.

When an automobile equipped with a body of the closed type is driven over the road, the vibrations arising from such use set up a drumming sound or rumble in the body, which sometimes becomes quite objectionable. This drum or rumble varies with the speed of the car and there are usually certain speed limits within which it is most pronounced. The purpose of our invention is to provide means for reducing or eliminating this drum or rumble. We have conducted a lengthy series of experiments with this end in view, and, as a result of these experiments, we propose to accomplish the purposes of our invention by providing a false roof panel, spaced from the roof panel proper a short distance, and preferably located over the forward central portion of the body. This false roof panel may extend across from one side of the body to the other, but we have found that this is not necessary and that the desired results will be attained when the panel is provided over the forward central portion of the body without extending to the sides of the roof. We have found that the results are better if the chamber formed between this false roof and the roof panel proper is filled with a fibrous material, such as cotton batting.

In the drawings we have illustrated an embodiment of our invention as applied to a body of the sedan type. The particular type of closed body and the particular structure thereof is immaterial, and may be of the usual or any well known construction. We have shown a body structure including a body, 10, cowl 11, posts 20, which support the windshield, and a roof panel 12. The roof panel 12 is shown, in this instance, as supported at its forward end by the windshield header 13, which also connects the upper ends of the posts 20. If desired, and as shown, transversely extending bows 15 may also be employed to aid in supporting the roof panel.

In accordance with our invention we provide an auxiliary or false roof panel indicated at 16, and this panel we dispose in the roof of the body below the roof panel 12 so as to form a space between said panels. Usually the roof panel, as shown, is curved both longitudinally, as indicated in Fig. 2, and transversely, as indicated in Fig. 3, while the auxiliary or false roof panel lies in a horizontal plane in installed position. We do not desire, however, to be limited or restricted in these respects. The auxiliary or false roof panel, 16, may be carried or supported in any desired or convenient manner. In the arrangement shown, to which, however, we do not desire to be limited or restricted, the auxiliary or false roof panel is supported at its forward edge upon a tacking strip, 14, which extends transversely across the body and is carried by the windshield header, 13, and at its rear edge said panel, 16, is supported upon a transversely disposed main roof panel supporting bow, 15. It is obvious that other means would readily occur to persons skilled in the art for supporting the auxiliary or false roof panel, the important feature in this respect being to support said panel in such relation with respect to the main roof panel, 12, as to provide a space or chamber between them. We have shown the auxiliary or false roof panel as symmetrically disposed with reference to the longitudinal central plane of the body, as indicated by the dot dash line in Fig. 3, that is, as extending to equal distances on opposite sides of said central plane and transversely across the body towards the sides of the main roof panel. It is to be understood, however, that it is immaterial so far as our invention is concerned whether the false roof panel extends all the way to the sides of the main roof panel, 12, or not. Likewise it is immaterial to what extent the false roof panel extends fore and aft of the main roof panel. Therefore, while we have shown said panel, 16, as extending longitudinally of the body from the windshield header, 13, to the forward main roof supporting bow, 15, we are not to be limited or restricted in this respect. We have found that a false roof structure, such as above described, installed beneath the main roof panel practically eliminates or substantially reduces the annoying rumble or drumming sounds in closed car bodies.

If desired, and in order to assist in the elimination or reduction of the rumbling and drumming noises of the body, the space or chamber between the main and false roof panels may be filled with suitable sound deadening material, such, for example, as cotton batting, indicated at 17. Our invention, however, is not to be limited or restricted in this respect. Where such a filling material is employed it may be retained and concealed within the space or chamber between the panels, 16, 12, in any convenient manner, as, for example, by means of the members or strips, 18, 19, of fabric or other suitable material.

While we have shown and described our invention as applied to closed automobile bodies, we do not desire to be limited or restricted in this respect as the benefits and advantages set forth may be also realized in the case of street railway, subway and other cars where a sheet metal main roof panel is employed in which vibrations are set up under the stresses and shocks incident to service operation.

Various modifications and changes in details will readily occur to persons skilled in the art without departure from the spirit and scope of our invention, and, therefore, we claim our invention broadly as indicated by the appended claim.

Having thus described our invention, what we claim as new and useful and desire to secure by Letters Patent is:

In a roof structure for closed automobile bodies, a roof panel extending over the entire roof of the closed body, a windshield header having means to support the forward extremity of said panel, a bow to support the forward end of said roof panel, said bow being located near but separated from said windshield header, and an auxiliary panel supported at its opposite ends by said header and bow respectively, and disposed below said roof panel to form a chamber therebetween.

In testimony whereof, we affix our signatures.

CLAUDE McCULLEY.
LOUIS E. RUEHLMANN.